United States Patent
Longobardi

(10) Patent No.: US 8,141,104 B2
(45) Date of Patent: *Mar. 20, 2012

(54) INTEGRATING NON-COMPLIANT PROVIDERS OF DYNAMIC SERVICES INTO A RESOURCE MANAGEMENT INFRASTRUCTURE

(75) Inventor: Roberto Longobardi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1030 days.

This patent is subject to a terminal disclaimer.

(21) Appl. No.: 12/054,829

(22) Filed: Mar. 25, 2008

(65) Prior Publication Data
US 2008/0178194 A1    Jul. 24, 2008

Related U.S. Application Data

(63) Continuation of application No. 10/671,914, filed on Sep. 24, 2003, now Pat. No. 7,383,551.

(30) Foreign Application Priority Data

Sep. 27, 2002  (EP) ..................... 02368105

(51) Int. Cl.
*G06F 3/00* (2006.01)
(52) U.S. Cl. ........ 719/316; 719/331; 719/332; 717/116; 717/165; 707/790
(58) Field of Classification Search .......... None
See application file for complete search history.

(56) References Cited

U.S. PATENT DOCUMENTS

| 6,654,759 | B1 * | 11/2003 | Brunet et al. ............... 1/1 |
| 6,965,932 | B1 * | 11/2005 | Rajaram et al. ............ 709/223 |
| 7,003,587 | B1 * | 2/2006 | Battat et al. ............... 709/227 |
| 2002/0022952 | A1 * | 2/2002 | Zager et al. .................. 703/22 |
| 2002/0144009 | A1 * | 10/2002 | Cheng et al. ............... 709/314 |
| 2003/0172088 | A1 * | 9/2003 | Mandal et al. ............. 707/200 |
| 2003/0195921 | A1 * | 10/2003 | Becker et al. .............. 709/200 |
| 2003/0220963 | A1 * | 11/2003 | Golovinsky et al. ....... 709/203 |
| 2003/0221051 | A1 * | 11/2003 | Hand et al. ................ 711/106 |
| 2004/0010542 | A1 * | 1/2004 | Kumar et al. .............. 709/203 |
| 2004/0024866 | A1 * | 2/2004 | Sundar et al. .............. 709/224 |

* cited by examiner

*Primary Examiner* — Andy Ho
*Assistant Examiner* — Shih-Wei Kraft

(57) ABSTRACT

The WMI architecture includes a framework, known as CIM Object Manager (or CIMOM), which exploits WMI providers of dynamic services for the managed objects; in the WMI architecture, the CIM providers must be implemented as Common Object Model (COM) objects and must comply with a specific WMI provider interface (named "IWbemServices"). The invention discloses integrating non-compliant providers, for example written in the Java language, into the WMI infrastructure. For this purpose, a bridge provider is associated with each managed object that is supported by the Java providers. The bridge provider identifies the Java provider that must be invoked to fulfill a particular request (based on a specific CIM qualifier); the parameters of the request are converted into Java types, and a corresponding method is called on an intermediate Java object. The intermediate Java object then routes the request to the appropriate Java provider.

6 Claims, 5 Drawing Sheets

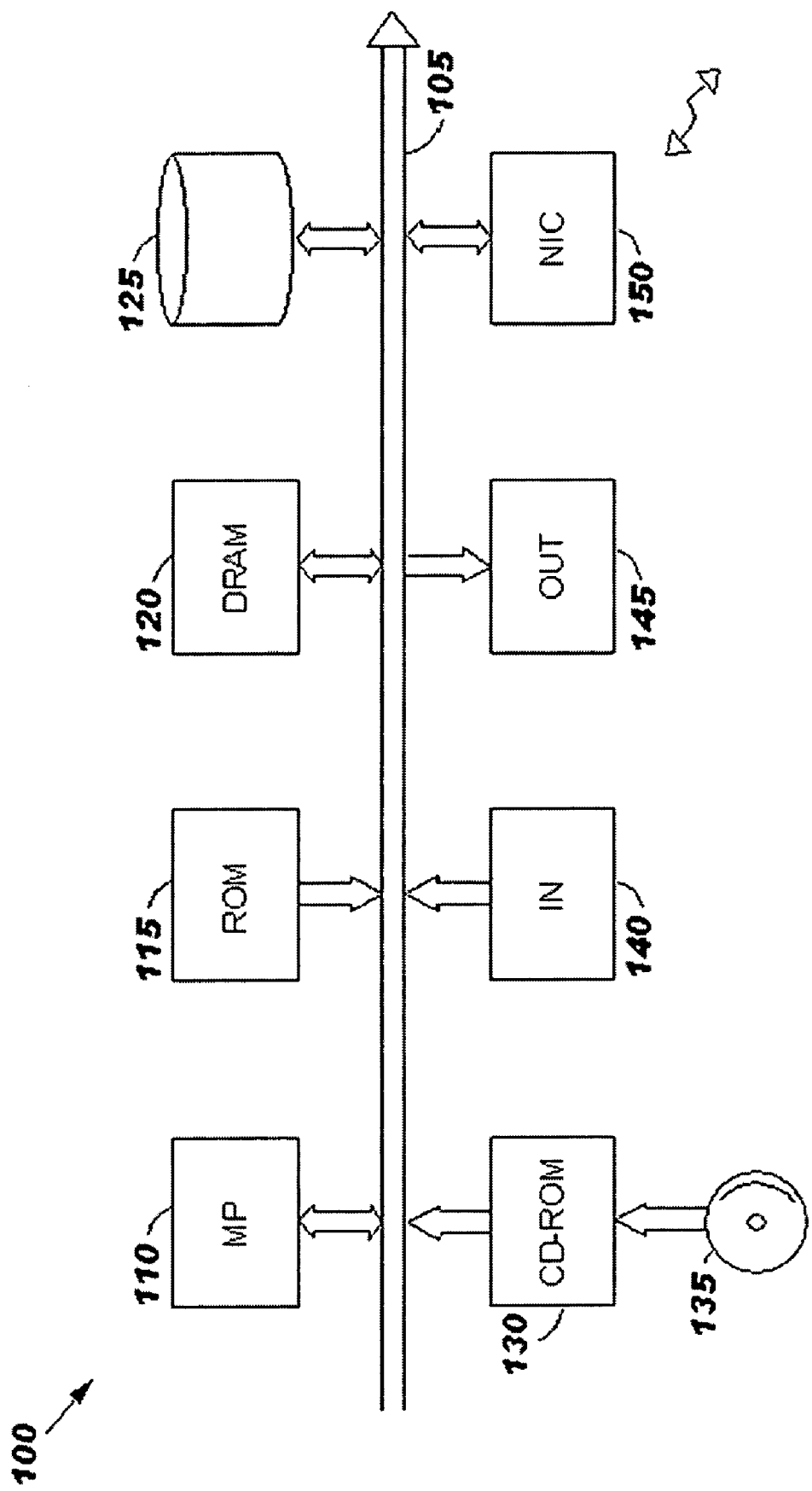

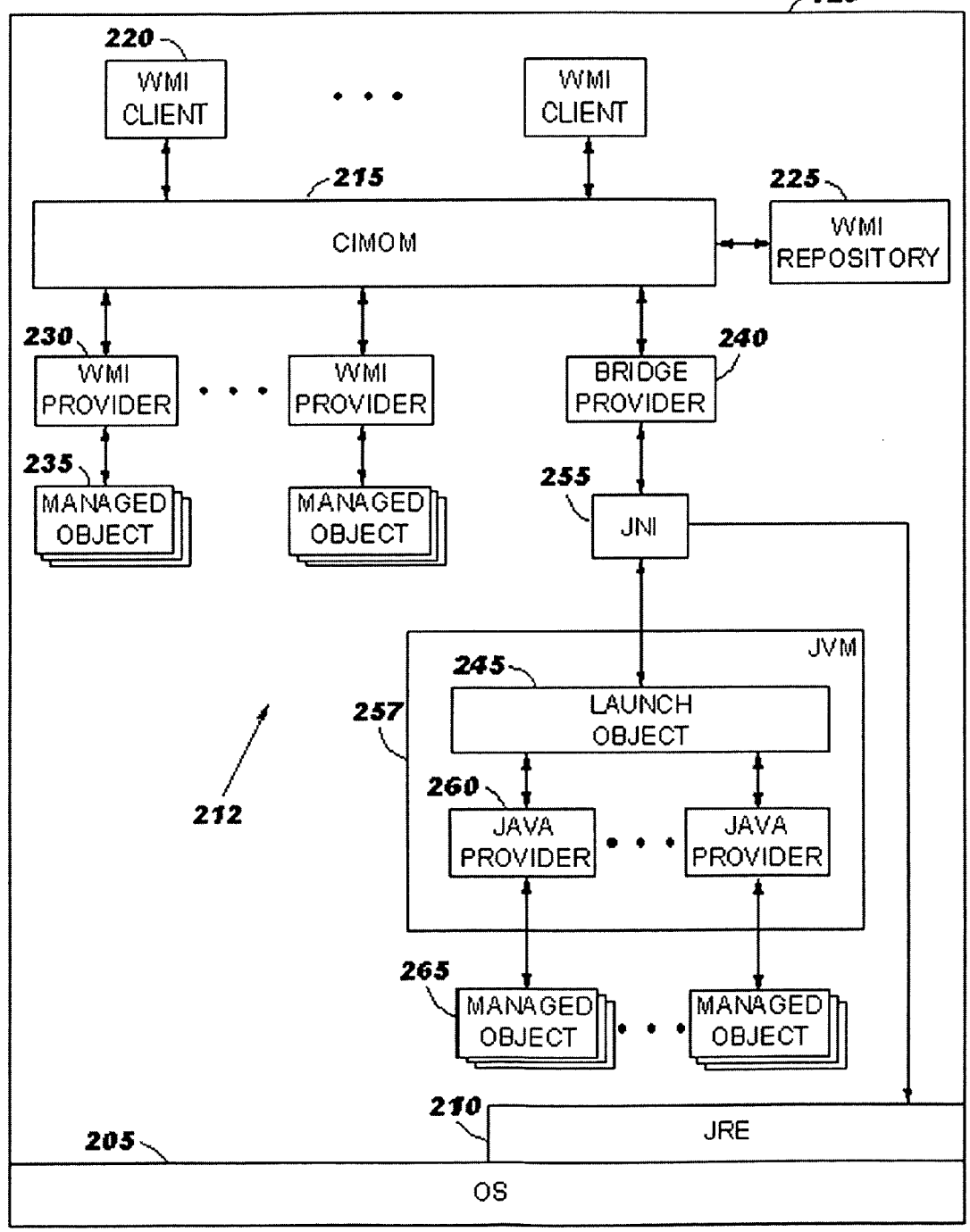

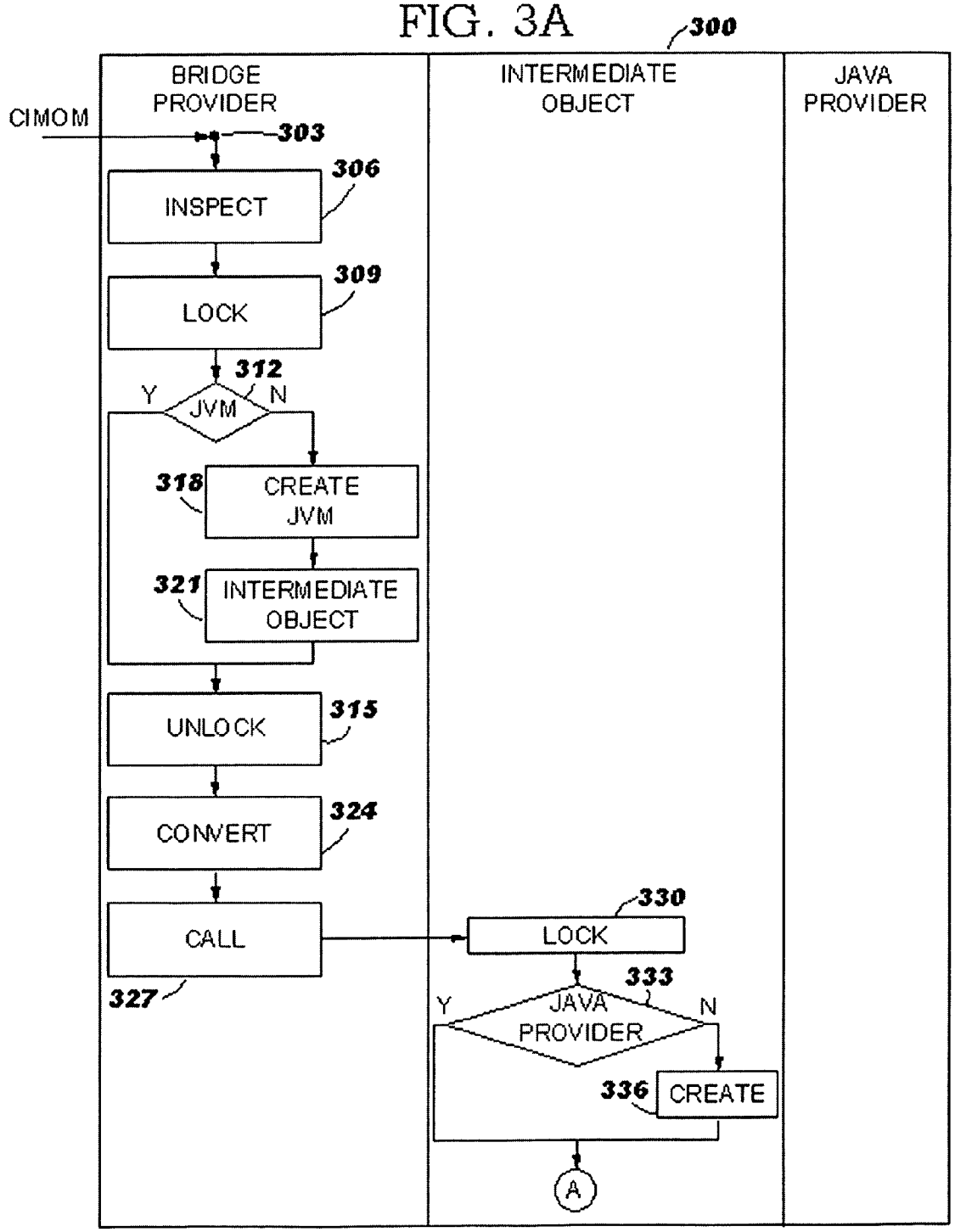

INTEGRATING NON-COMPLIANT PROVIDERS OF DYNAMIC SERVICES INTO A RESOURCE MANAGEMENT INFRASTRUCTURE

TECHNICAL FIELD

The present invention relates to the data processing field, and more specifically to a method and system for integrating non-compliant providers of dynamic services into a resource management infrastructure.

BACKGROUND ART

Management of entities representing different types of resources (such as software applications or hardware devices) is a critical issue in a data processing system, especially a computer network. This problem is particular acute for resources that have a high level of complexity or are distributed across a large number of installations.

Several technologies have been proposed in the last years for implementing a resource management infrastructure. For example, the Common Interface Model (CIM) is a standard specification that abstracts and describes the resources to be managed using an object-oriented paradigm. The CIM model may be supported by different frameworks, which provide a uniform way for management applications to access the managed objects. Each framework (also known as CIM Object Manager, or CIMOM) exploits providers of dynamic management services (each one acting as an intermediary between the framework and associated managed objects).

Particularly, the Windows Management Instrumentation (WMI) is the implementation of the CIM model proposed by Microsoft Corporation and running on the Windows operating system. In the WMI architecture, the CIM providers must be implemented as objects conforming to the Common Object Model (COM) specification and must comply with a particular WMI provider interface (named "IWbemServices"). Microsoft and Windows are trademarks of Microsoft Corporation.

The COM objects are natively supported only on the Windows operating system. This is a major problem, which strongly limits the integration of non-compliant providers available for different operative environments into the WMI architecture. Moreover, this limits the ability to implement providers that can be used with frameworks running on different operating systems.

SUMMARY OF THE INVENTION

It is an object of the present invention to integrate non-compliant providers of dynamic services into the resource management infrastructure.

It is another object of the present invention to achieve this integration without substantially affecting operation of the resource management infrastructure.

It is yet another object of the present invention to integrate the non-compliant providers into the resource management infrastructure in a simple and effective way.

The accomplishment of these and other related objects is achieved, in a resource management infrastructure including a framework for allowing management applications to access managed objects, the framework supporting compliant providers of dynamic services for the managed objects running in a first operative environment, by a method of integrating a plurality of non-compliant providers of dynamic services for a set of the managed objects, the non-compliant providers running in a second operative environment that is not supported by the framework, wherein the method includes the steps of: the framework requesting a first dynamic service for a selected managed object of the set to a compliant provider associated with the selected managed object, the compliant provider identifying a non-compliant provider associated with the selected managed object, the compliant provider requesting a second dynamic service for the selected managed object, corresponding to the first dynamic service, to an intermediate entity running in the second operative environment passing an indication of the non-compliant provider, the intermediate entity routing the request of the second dynamic service to the non-compliant provider.

Moreover, the present invention also provides a computer program for performing the method and a product storing the program.

The invention also encompasses a corresponding system for integrating the non-compliant providers, and a resource management infrastructure including this system.

The novel features believed to be characteristic of this invention are set forth in the appended claims. The invention itself, however, as well as these and other related objects and advantages thereof, will be best understood by reference to the following detailed description to be read in conjunction with the accompanying drawings.

BRIEF DESCRIPTION OF THE DRAWINGS

FIG. 1 is a schematic block diagram of a computer in which the method of the invention can be used;

FIG. 2 shows a partial content of a working memory of the computer;

FIGS. 3a and 3b illustrate an activity diagram of a resource management process;

DETAILED DESCRIPTION OF THE PREFERRED EMBODIMENT

Figure 3B:
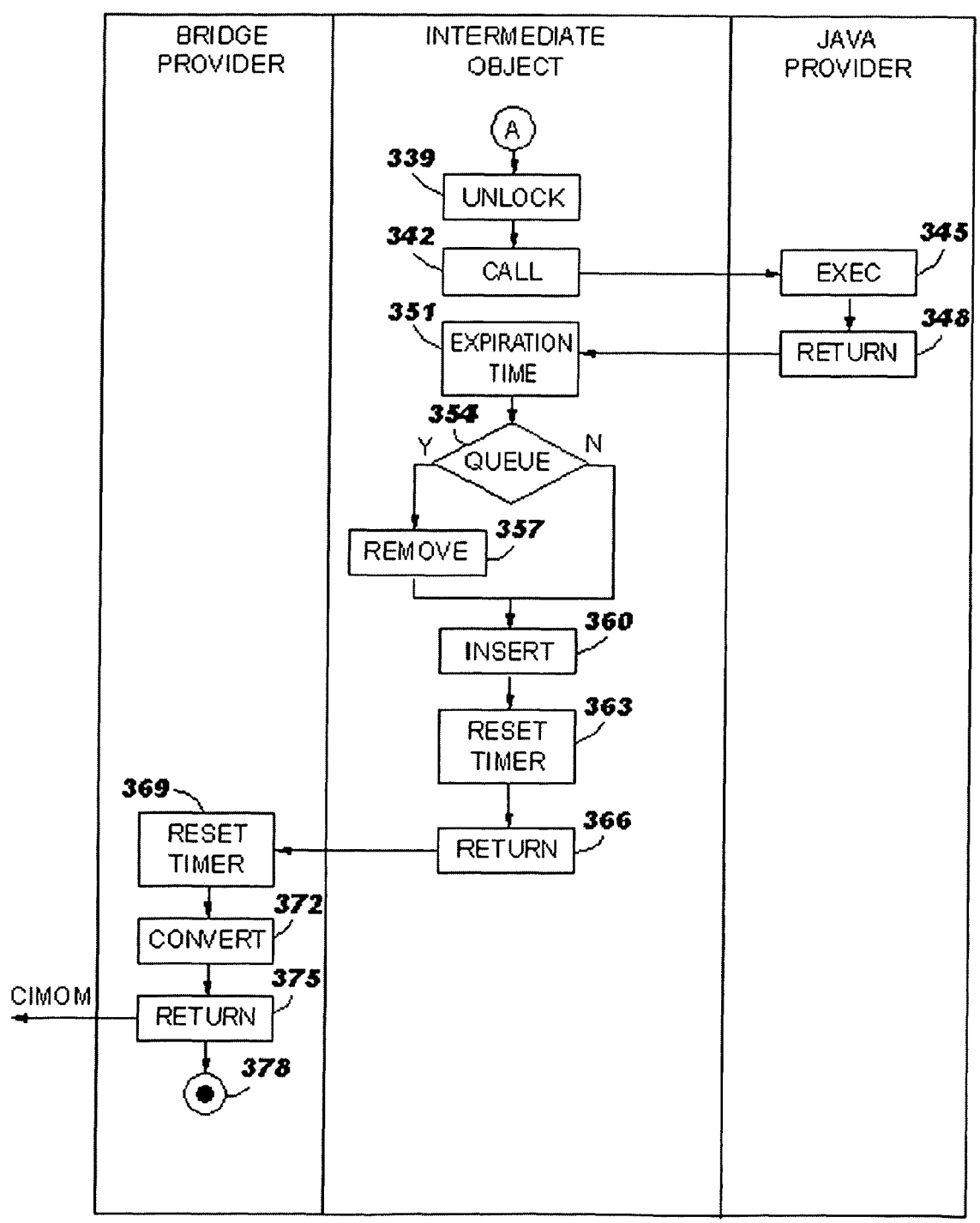

With reference in particular to FIG. 1, a data processing system 100 (such as a Personal Computer) is shown. The computer 100 is formed by several units, which are connected in parallel to a communication bus 105. In detail, a microprocessor (.mu.P) 110 controls operation of the computer 100, a Read Only Memory (ROM) 115 stores basic code for a bootstrap of the computer 100, and a DRAM 120 is directly used as a working memory by the microprocessor 110. Several peripheral units are further connected to the bus 105 (by means of respective interfaces). Particularly, a mass memory consists of a magnetic hard-disk 125 and a driver 130 for reading CD-ROMs 135. Moreover, the computer 100 includes input devices 140 (for example, a keyboard and a mouse), and output devices 145 (for example, a monitor and a printer). A network Interface Card (NIC) 150 is used to connect the computer 100 to a network, typically the INTERNET.

Similar considerations apply if the computer has a different structure (for example, with a multiprocessor architecture), if the computer includes other units (such as a scanner), if the computer is replaced with an equivalent data processing system (for example, consisting of a network of computers), and the like.

Considering now FIG. 2, a partial content of the working memory 120 of the computer in operation is shown; the information (programs and data) is typically stored on the hard-disk and loaded (at least partially) into the working memory when the programs are running. The programs are initially installed onto the hard disk from CD-ROM.

An operating system (OS) 205 (such as Windows XP) provides a software platform for the computer, on top of which other programs can run. A Java Runtime Environment (JRE) 210 is installed over the operating system 205. The JRE 210 consists of a Java Virtual Machine (JVM), Java core classes and supporting files, which define a standard platform for running applications written in the Java language; particularly, the JVM provides an abstract computing machine for Java applications, which machine is independent of the underlying (hardware and software) platform of the computer. Windows XP is a trademark of Microsoft Corporation. Java and Java-related marks are trademarks of Oracle Corporation.

The computer implements an infrastructure 212 for managing several kinds of physical or logical resources; for example, the resources are stand-alone programs, client-server applications, INTERNET-based services, computers, hardware devices, controllers, people, organizations, and the like. Each resource is instrumented to enable access to corresponding information (such as data, events and status). For this purpose, the resource is modeled as an object conforming to the CIM specification. The CIM model defines a standard schema for data with a basic set of classes, methods and associations; particularly, core models incorporate notions applicable to all management domains, whereas common models incorporate notions applicable to specific management domains (such as networks, applications, devices and users).

The structure and the content of the models are described in the Managed Object Format (MOF). The MOF syntax supports keywords (known as qualifiers), which are enclosed between brackets before a class or property declaration; each qualifier consists of a name/value pair that describes and characterizes the class or property. A particular qualifier "Key" is used to reference managed objects consisting of specific instances of a CIM class; particularly, the managed objects are named by concatenating the values of all the properties of the class that are qualified by "Key" (which concatenation defines a so-called modelname).

The CIM model is supported by the Windows Management Instrumentation (WMI) architecture. The WMI architecture includes a framework 215 (known as CIM Object Manager, or CIMOM), which provides a uniform way for management applications (or WMI clients) 220 to access the managed objects (irrespective of their implementation). For this purpose, the CIMOM 215 exposes an interface "IWbemServices", which defines a series of methods that can be called by the WMI clients 220. For example, the CIMOM 215 allows managed objects to be created, deleted, and manipulated; moreover, it supports event notification and query-based data retrieval.

The CIMOM 215 interfaces with a WMI repository 225. The repository 225 stores static management data (managed objects and associations). Management data in the repository 225 is organized in logic collections (schema), which are loaded into corresponding namespaces; a namespace provides a domain (or container) for a schema and for the instances of the CIM classes in that schema. The namespace path and its modelname unambiguously specify each managed object in the repository 225.

The CIMOM 215 further exploits one or more WMI providers 230 of dynamic management services. Each instance of a WMI provider 230 acts as an intermediary between the CIMOM 215 and associated managed objects 235; the instance of the WMI provider 230 always supports a single namespace (which is set during its initialization). The WMI provider 230 manages dynamic data relating to the managed objects 235 (which data is not available in the repository 225); in addition, the WMI provider 230 implements notification of events that are not supported by the CIMOM 215. Information about which WMI provider 230 to contact for dynamic data or event notifications is stored in the repository 225. Particularly, a CIM class whose instances are created dynamically is denoted preceding its declaration with a qualifier "Dynamic" and a qualifier "Provider"; the value of the qualifier "Provider" is the name of the WMI Provider 230 associated with all the managed objects instantiating the CIM class. Different WMI providers 230 may be specified before selected properties; in this case, the property is supported by the corresponding WMI provider 230 (instead of the one defined at class level).

The WMI providers 230 must be objects conforming to the COM specification, which objects implement the interface "IWbemServices". The WMI providers 230 may be either in-proc or out-proc; in the first case, the WMI providers are implemented as native Windows libraries (DLL) and run in the same process of the CIMOM 215, whereas in the second case they are stand-alone executables. An additional (out-proc) WMI provider 240 acts as a bridge between the WMI architecture and the Java environment. The bridge provider 240 communicates with a Java intermediate object 245 through the Java Native Interface (JNI) 255. The JNI 255 allows Java objects to operate with native applications and libraries written in other languages; vice-versa, the native methods can utilize Java objects in the same way that Java code uses these objects. As described in detail in the following, the intermediate object 245 is used to create a JVM instance 257 and to launch a series of providers 260 written in the Java language. The Java providers 260 support dynamic services for a set of corresponding managed objects (denoted with 265). The name of the Java provider 260 associated with a specific CIM class or property is indicated in the MOF description by means of a new qualifier "Java_Provider" (preceding its declaration). This also allows for simple and even dynamic assignment of Java providers 260 to a resource modeled with a particular CIM class, thereby maintaining the loose-coupling of managed objects and providers typical of the CIM model.

Similar considerations apply if the programs are distributed on any other computer readable medium (such as one or more floppy-disks), if different modules or functions are provided, if an equivalent resource management infrastructure is implemented (even based on a different model), if the CIM models are expressed with another syntax (for example, using the Extensible Markup Language, or XML), if all the managed objects are associated with Java providers, and the like. Alternatively, the framework runs in a different operative environment (such has UNIX), the non-compliant providers are written in another language (for example, the PERL or a shell language), the bridge provider is in-proc, the bridge provider interfaces with the intermediate object (or an equivalent entity) in another way, or the bridge provider and the Java providers are associated with the managed objects in a different manner.

Moving now to FIGS. 3a and 3b, the flow of activities of a generic resource management process 300 is illustrated. Whenever a WMI client needs to perform some operations on the managed objects, a corresponding method exposed by the interface "IWbemServices" of the CIMOM is called. If the operation only involves static management data that is held in the repository, the CIMOM processes the request directly. Conversely, the relevant CIM class in the repository is inspected to identify the associated WMI providers to be exploited. One or more methods is then called on each WMI provider for implementing the requested service.

Assuming that the request relates to a CIM class specifying the bridge provider with the qualifier "Provider", the process begins at the black start circle 303 wherein the CIMOM calls the method on the bridge provider (passing the relevant CIM class as a parameter). In response thereto, the bridge provider in turn inspects the CIM class at block 306, so as to identify the corresponding Java provider (specified with the qualifier "Java_Provider").

A semaphore is then locked at block 309; the semaphore is used to ensure that operations relating to the creation of the JVM are carried out in mutual exclusion (among concurrent threads running the bridge provider). A test is made at decision block 312 to determine whether the JVM has already been created; for this purpose, the bridge provider verifies whether a corresponding global pointer is set. If so, the process descends into block 315 (described in the following). Conversely, the bridge provider at block 318 creates the JVM and sets the corresponding global pointer (using the JNI). Continuing to block 321, the intermediate object is instantiated inside the JVM. The process then passes to block 315. Considering now block 315, the semaphore on the JVM is unlocked (thereby resuming the threads waiting on it).

The process proceeds to block 324, wherein the information passed to the bridge provider in the called method is converted from MOF types to Java types. More specifically, the bridge provider converts all the parameters (if any) passed with the called method. Moreover, each method of the interface "IWbemServices" may include an additional parameter pointing to an object of the type "IWbemContext". This object (consisting of a simple container of named values) is used by the WMI clients to communicate context information to the WMI providers, which information cannot be specified in the standard parameters; the information is completely opaque to the CIMOM, and it is simply forwarded to the WMI providers. If the pointer is not null, the bridge provider enumerates and converts every value included in the object "IWbemContext".

In both cases, the conversion is carried out simply assigning a pre-set Java type to each MOF type, as specified in the following table:

| MOF type | Windows Automation (VARIANT) type | Java type |
|---|---|---|
| Boolean | VT_BOOL | java.lang.Boolean \| Boolean |
| Datetime | VT_BSTR | Date |
| <Classname> \| object \| ref | VT_Unknown | Non-applicable, since parameters of this type contain references to instances of different classes that are handled directly by CIMOM and must be ignored by the WMI providers |
| Void | — | java.lang.Void \| Void |
| Sint8 | VT_I2 | java.lang.Byte \| Byte |
| Sint16 | VT_I2 | java.lang.Integer \| Int |
| Sint32 | VT_I4 | java.lang.Integer \| Int |
| Sint64 | VT_BSTR | java.lang.Long \| long |
| Real32 | VT + R4 | java.lang.Float \| |

-continued

| MOF type | Windows Automation (VARIANT) type | Java type |
|---|---|---|
| | | Float |
| Real64 | VT_R8 | java.lang.Double \| Double |
| Uint8 | VT_Ut1 | java.lang.Integer \| Int |
| Uint16 | VT_I4 | java.lang.Integer \| Int |
| Uint64 | VT_BSTR | java.lang.Long \| Long |
| Char16 | VT_I2 | java.lang.String |
| String | VT_BSTR | java.lang.String |

With reference now to block 327, a method corresponding to the one called on the bridge provider is called on the intermediate object (using the JNI); the identifier of the managed object (namespace path and modelname), the name of the Java provider and the converted parameters are passed to this method. In response thereto, the intermediate object locks a further semaphore at block 330, in order to ensure that the operations relating to the instantiation of the Java provider are carried out in mutual exclusion (among concurrent threads running the intermediate object). A test is made at decision block 333 to determine whether the Java provider has already been instantiated; for this purpose, the intermediate object verifies whether an identifier of the Java provider is stored in a global object "Provider_table" of the type "Hashtable". If not, the process continues to block 336; the intermediate object instantiates the Java provider and updates the object "Provider_table" accordingly. The process then continues to block 339. Conversely (Java provider already instantiated), the flow of activities descends into block 339 directly. Considering now block 339, the semaphore on the Java provider is unlocked.

Moving to block 342, a method corresponding to the one called on the intermediate object is then called on the Java provider, passing the identifier of the managed object and the converted parameters. The process continues to block 345 in the swim-lane of the Java provider, wherein the operations needed to implement the requested service are carried out. Any results and/or exceptions of the method are returned to the intermediate object at block 348.

Referring back to the swim-lane of the intermediate object, an expiration time of the Java provider is calculated at block 351 by adding a predetermined value (for example, 0.5 h) to a current time. A test is made at decision block 354 to verify whether a record specifying the Java provider is present in a global FIFO (First In, First Out) queue (used to manage a time-out for all the Java providers, as described in the following). If so, the record is removed from the FIFO queue at block 357, and the process then continues to block 360; conversely, the flow of activities descends into block 360 directly. Considering now block 360, a new record including an identifier of the Java provider together with its expiration time is inserted into the FIFO queue. A timer is then reset at block 363 to the expiration time of the first record to be extracted from the FIFO queue.

The process proceeds to block 366, wherein the results and exceptions (if any) received from the method called on the Java provider are returned to the bridge provider (using the JNI). Referring now to block 369 in the swim-lane of the bridge provider, a further timer (used to manage a time-out for the JVM, as described in the following) is reset to a predetermined value (for example, 0.5 h). Proceeding to block 372, the results collected from the method called on the Java provider are converted back from Java types to MOF types; at the same time, any caught exception is mapped to a corresponding error code (for example, exploiting a pre-set table). An appropriate result of the method originally called on the bridge provider is constructed using the converted results and exceptions, and it is then returned to the CIMOM at block 375 (in order to allow the CIMOM to complete the operations requested by the WMI client). The process then ends at the concentric white/black stop circles 378.

Figure 4A:
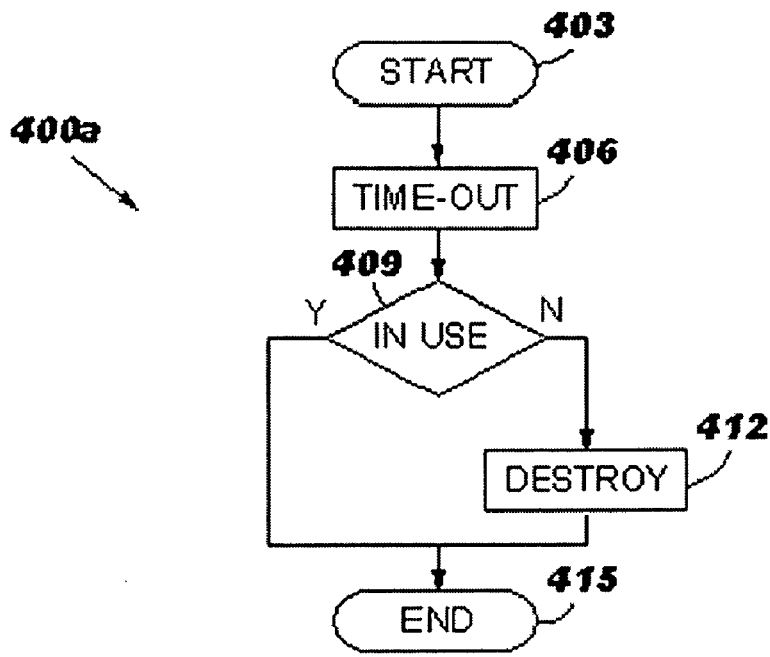
FIGS. 4a-4b are flow charts describing how different time-outs are managed in the process.

Moving now to FIG. 4a, the operations carried out by the bridge provider for managing the time-out for the JVM implements a method 400a. The method starts at block 403, and then passes to block 406 in response to a signal received from the corresponding timer at the end of the time interval to which it was reset (at block 369 in FIG. 3b). A test is made at decision block 409 to determine whether the JVM is currently in use (by other threads). If not, the JVM is destroyed at block 412, and the method ends at the final block 415. Conversely, the method descends into the final block 415 directly.

Figure 4B:
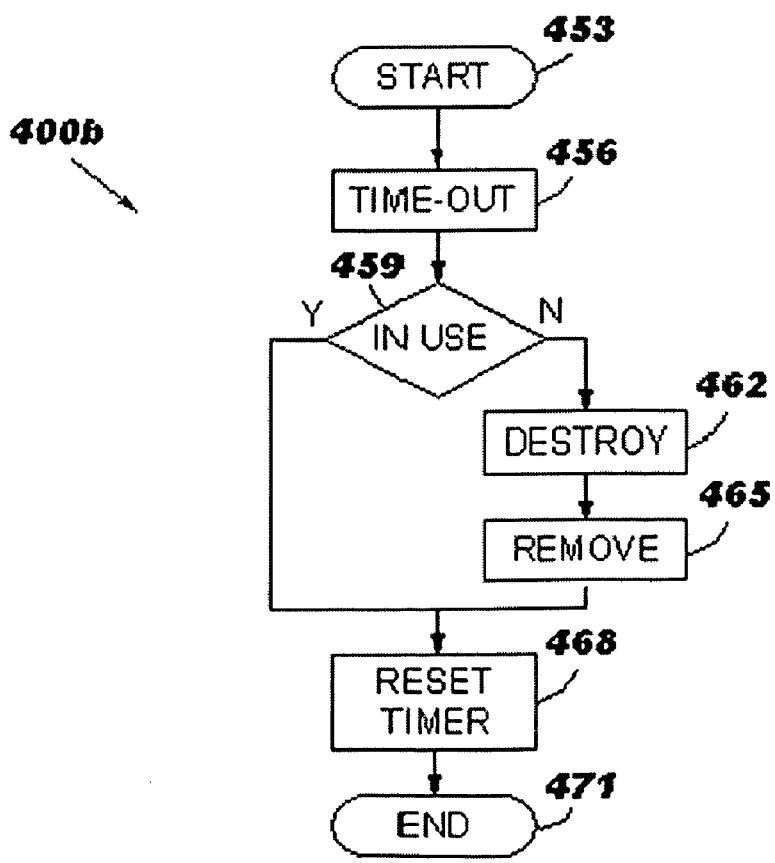

Likewise, the operations carried out by the intermediate object for managing the time-out for the Java providers are illustrated in FIG. 4b. The operations implement a method 400b that starts at block 453. The method then passes to block 456 in response to a signal received from the corresponding timer at the end of the time interval to which it was reset (at block 363 in FIG. 3b). A test is made at decision block 459 to determine whether the Java provider specified in the first record to be extracted from the FIFO queue is currently in use. If not, this Java provider is destroyed at block 462 and the corresponding record is removed from the FIFO queue at block 465; the method then passes to block 468. Conversely, the method descends into block 468 directly. With reference now to block 468, the timer is reset to the expiration time of the new first record to be extracted from the FIFO queue. The method then ends at the final block 471.

For example, let us consider a generic CIM class "MyClass" defined by the following file "MyClass.mof":

```
[Dynamic,
Description ("MyClass description"),
Provider("BridgeProvider"),
Java_Provider("mypackage.MyJavaProv- ider")
]
class MyClass
{
[Key,
Description ("MyClass key identifying any instance thereof")
]
sint32 InstanceIdentifier;
[Description ("Some properties associated with the Java provider
defined at class level")]
    String MyPropertyA;
    String MyPropertyB;
    String MyPropertyC;
    [Description ("A property associated with a different Java
provider"),
    Java_Provider("mypackage MyJavaProvider1")
]
    String MyProperty1;
}
```

Typically, all the operations requested to the CIMOM by the WMI clients are carried out calling a method "CreateInstanceEnumAsync" on the appropriate providers. This method creates an enumerator that asynchronously supplies the instances of a CIM class according to specified selection criteria; the method returns immediately after being called so that the CIMOM can continue its execution while the request is pending. The signature of the method "CreateInstanceEnumAsync" is:

```
HRESULT CreateInstanceEnumAsync(
    const BSTR srtClass,
    LONG Falgs,
    IWbemContext* pCtx,
    IWbemObjectSink* pResponseHandler )
```

The parameter "srtClass" includes the name of the CIM class for which instances are desired, the parameter "lFlags" is a flag defining operation of the method, the parameter "pCtx" is a pointer to the object "IWbemContext", and the parameter "pResponseHandler" is a pointer to the object receiving the instances of the CIM class as they become available; the method returns a value indicating the status of the operation.

After the instances of the CIM class have been enumerated, the CIMOM can perform different operations. For example, a method "GetProperty" retrieves the value of an individual property, a method "PutProperty" updates the value of a selected property, and a method "ExecMethod" executes a method exported by the WMI provider.

Accordingly, each Java provider implements an interface "JavaProviderInterface", which exposes methods corresponding to the ones of the bridge provider. This interface is defined as follows:

```
import java.util.*;
public interface JavaProviderInterface
{
    public Enumeration createInstanceEnum(String nameSpace, String
    className, Hashtable context) throws CIMException;
    public Object getProperty(String nameSpace, String className,
    Hashtable targetInstance, String propertyName, Hashtable context)
    throws CIMException;
    public Hashtable getMultipleProperties(String nameSpace, String
    className, Hashtable targetInstance, String propertyNames[ ],
    Hashtable context) throws CIMException;
    public void putProperty(String nameSpace, String className,
    Hashtable targetInstance, String PropertyName, Object
    propertyValue, Hashtable context) throws CIMException;
    public Object execMethod (String nameSpace, String className,
    Hashtable targetInstance, String methodName, Vector inParms,
    Vector outParms, Hashtable context) throws CIMException;
}
```

In detail, the method createInstanceEnum receives a parameter "nameSpace" including the namespace path of the CIM class, a parameter "className" including the name the CIM class, and a parameter "context" including the context information passed to the bridge provider; the method throws exceptions in the object "CIMException" and returns an enumeration of objects "Hashtable", each one for a retrieved instance of the CIM class.

The method "getProperty" receives the parameters "nameSpace", "className" and "context", a parameter "targetInstance" including the modelname of the managed object, and a parameter "propertyName" including the name of the selected property; the method throws the exceptions "CIMException" and returns the value of the property. The additional method "getMultipleProperties" receives the parameters "nameSpace", "className", "context", "targetInstance", and a parameter "propertyName[ ]" including a list of the names of the properties associated with the Java provider defined at class level; the method throws the exceptions "CIMException" and returns the values of all these properties at the same time. The method "putProperty" receives the parameters "nameSpace", "className", "targetInstance", "propertyName" and "context", and a parameter "property- Value" including the value to be assigned to the selected property; the method throws the exceptions "CIMException" and does not return any value. At the end, the method "execMethod" receives the parameters "nameSpace", "className", "targetInstance" and "context", a parameter "methodName" including the name of the method to be called on the managed object, a parameter "inParms" including the values to be passed to the called method, and a parameter "outParms" for the values returned by the called method; the method throws the exceptions "CIMException" and returns a result of the operation.

For example, let us consider that the CIMOM needs to enumerate the instances of the CIM class "MyClass". For this purpose, the CIMOM calls the method "createInstanceEnumAsync" on the associated WMI provider "BridgeProvider". In response thereto, the WMI provider "BridgeProvider" inspects the CIM class "MyClass", so as to identify the corresponding Java provider "MyJavaProvider". The method "createInstanceEnum" is then called on the intermediate object, passing the information received from the CIMOM (after their conversion) together with the string "MyJavaProvider". The intermediate object in turn routes this method to the Java provider "MyJavaProvider". The method returns an enumeration of the retrieved instances of the CIM class "MyClass" to the intermediate object, which passes the enumeration back to the WMI provider "BridgeProvider". For each instance, the WMI provider "BridgeProvider" creates a CIM instance, which is used to store information about the managed object; an entry of the CIM instance corresponding to the property "Key" is filled with the name of the instance (after its conversion).

The CIM class "MyClass" is then inspected to identify its properties (and their associated Java providers). The method "getMultipleProperties" is then called on the intermediate object and then on the Java provider "MyJavaProvider", passing the names of all the properties associated with the Java provider defined at class level (i.e., "PropertyA", "PropertyB" and "PropertyC" in the example at issue). The values of these properties are returned to the intermediate object and then to the WMI provider "BridgeProvider"; the values are then stored in the corresponding entries of the CIM instance (after their conversion). For each property associated with a different Java provider, the method "getProperty" is then called on the associated Java provider through the intermediate object (in the example at issue, the method "getProperty" is called on the Java provider "MyJavaProvider1" passing the string "MyProperty1"). The value of the property returned by the Java provider through the intermediate object is then stored in the corresponding entry of the CIM instance (after its conversion). As soon as the values of all the properties have been retrieved, the CIM instance is returned to the CIMOM.

Similar considerations apply if equivalent methods are performed, if the operations relating to the creation/destruction of the JVM (or of an alternative operative environment) are managed in a different way (for example, with the operative environment that is removed immediately after its use), if the non-compliant providers are created/destroyed in another manner, if the information passed by and returned to the bridge provider is converted with a different mechanism, if context information is not supported, if the time-outs have different values, it the time-outs are configurable dynamically, if the exceptions thrown by the methods called on the Java providers are used in another way, and the like.

More generally, the present invention proposes a method for use in a resource management infrastructure. The infrastructure includes a framework for allowing management applications to access managed objects; the framework supports compliant providers of dynamic services for the managed objects running in a first operative environment. The method of the invention is used to integrate a plurality of non-compliant providers of dynamic services for a set of the managed objects; the non-compliant providers run in a second operative environment that is not supported by the framework. In the proposed solution, the framework requests a first dynamic service for a selected managed object of the set to a compliant provider associated with the selected managed object. The compliant provider identifies a non-compliant provider associated with the selected managed object. The compliant provider then requests a second dynamic service for the selected managed object (corresponding to the first dynamic service) to an intermediate entity running in the second operative environment; an indication of the non-compliant provider is also passed to the intermediate object. In response thereto, the intermediate entity routes the request of the second dynamic service to the non-compliant provider.

The proposed solution allows non-compliant providers to be integrated in the resource management infrastructure directly; as a consequence, non-compliant providers already available may be used and/or new providers may be developed exploiting any operative environment (even if it is not supported by the framework).

This result is achieved without any substantial impact on the operation of the resource management infrastructure. In fact, the bridge provider exposes the usual native interface to the framework; it is then the intermediate object that routes the requests of each dynamic service to the appropriate provider in a way that is completely opaque to the framework. The solution of the invention is very simple (since a single intermediate object acts as a front-end for the bridge provider); moreover, the resulting loss of performance in the resource management framework is substantially insignificant in practice.

The preferred embodiment of the invention described above offers further advantages.

Particularly, parameters (including context information typical of the WMI architecture) passed to the bridge provider are converted and then passed to the intermediate object (for the Java provider).

A similar mechanism is exploited for returning any result to the framework.

In this way, information can be passed to and/or returned from the Java provider in a very simple way.

Preferably, the bridge provider is common to all the CIM classes associated with the Java providers.

The proposed feature concentrates the interface between the WMI architecture and the Java language into a single component.

However, the solution according to the present invention leads itself to be implemented even managing the parameters and the results in a different manner, with methods that do not require any parameter and/or do not return any result, or even exploiting two or more bridge providers (for example, interfacing with different categories of Java providers).

Advantageously, the JVM is created by the bridge provider on its first use and it is then re-used for subsequent operations; the JVM is then destroyed after a predetermined time-out.

Therefore, processing time is saved since a single JVM is running at any time; moreover, the destruction of the JVM avoids any wastage of system resources when the JVM is not used for a long time.

As a further improvement, each Java provider is created and destroyed in a similar manner.

Therefore, the Java providers use system resources only when they are necessary.

Preferably, the time-out for the different Java providers is managed through a single timer (with the aid of a FIFO queue).

The devised mechanism is very simple, but at the same time effective.

However, the proposed solution is also suitable to be implemented creating the JVM and each Java provider in a different way, without destroying the JVM and/or the Java providers, or using a different mechanism for managing the time-out for the Java providers (even with multiple timers).

Advantageously, the solution according to the present invention is implemented with a computer program, which is provided as a corresponding product stored on a suitable medium.

Alternatively, the program is pre-loaded onto the harddisk, is sent to the computer through a network (typically the INTERNET), is broadcast, or more generally is provided in any other form directly loadable into a working memory of the computer. However, the method according to the present invention leads itself to be carried out even with a hardware structure (for example, integrated in a chip of semiconductor material).

Naturally, in order to satisfy local and specific requirements, a person skilled in the art may apply to the solution described above many modifications and alterations all of which, however, are included within the scope of protection of the invention as defined by the following claims.

The invention claimed is:

1. A computer program product for implementing a resource management infrastructure including a framework for allowing management applications to access a set of managed objects, the framework supporting compliant providers of dynamic services for the managed objects running in a first operative environment and for integrating a plurality of non-compliant providers of dynamic services for said set of the managed objects, the non-compliant providers running in a second operative environment that is not supported by the framework, the computer program product comprising a computer usable storage medium having computer executable program code embodied therewith, the computer executable program code comprising:

computer executable program code configured requesting a first dynamic service for a selected managed object of the set from a compliant provider associated with the selected managed object, the compliant provider being common to all the managed objects of the set;

computer executable program code configured causing the compliant provider to convert at least one first parameter received from the framework with the request of the first dynamic service into at least one second parameter supported by the second operative environment;

computer executable program code configured causing the compliant provider to identify a non-compliant provider associated with the selected managed object;

computer executable program code configured causing the compliant provider to determine whether the second operative environment currently exists;

computer executable program code configured causing the compliant provider to create the second operative environment if the determination was that the second operative environment does not currently exist;

computer executable program code configured causing the compliant provider to send a request for a second dynamic service for the selected managed object, corresponding to the first dynamic service, to an intermediate object running in the second operative environment, said request comprising an identifier for the non-compliant provider;

computer executable program code configured causing the compliant provider to pass the at least one second parameter to the intermediate object with the request for the second dynamic service;

computer executable program code configured causing the intermediate object to route the request for the second dynamic service to the non-compliant provider, the intermediate object passing the at least one second parameter to the non-compliant provider with the request for the second dynamic service;

computer executable program code configured causing the non-compliant provider to return the result of the second dynamic service to the intermediate entity;

computer executable program code configured causing the intermediate object to return the result of the second dynamic service to the compliant provider;

computer executable program code configured causing the compliant provider to construct a result of the first dynamic service according to the result of the second dynamic service;

computer executable program code configured causing the compliant provider to return the result of the first dynamic service to the framework; and computer executable program code configured causing the compliant provider to destroy the second operative environment after a predetermined time-out from a last use thereof.

2. A computer program product according to claim 1, further comprising:

computer executable program code configured causing the intermediate object to make a determination whether each non-compliant provider currently exists;

computer executable program code configured causing the intermediate object to create each non-compliant provider determined not to currently exist; and computer executable program code configured causing the intermediate object to destroy a non-compliant provider after a predetermined further time-out from a last use thereof.

3. A computer program product according to claim 2, further comprising:

computer executable program code configured causing the intermediate object to, when requesting the second dynamic service from a non-compliant provider, remove a record including an identifier of the non-compliant provider from a FIFO queue and insert a new record into the FIFO queue including the identifier of the non-compliant provider together with an expiration time thereof calculated to add further time to a current time;

computer executable program code configured causing the intermediate object to set a signaling time of a timer to the expiration time of a first record to be extracted from the FIFO queue;

computer executable program code configured causing the intermediate object to, in response to the timer reaching the signaling time, destroy the non-compliant provider identified in the first record of the FIFO queue;

computer executable program code configured causing the intermediate object to extract the first record from the FIFO queue; and computer executable program code configured causing the intermediate object to set the signaling time of the timer to an expiration time of a next record to be extracted from the FIFO queue.

4. A resource management infrastructure comprising:
a framework for enabling management applications to access managed objects;
a compliant provider of dynamic services for the managed objects running in a first operative environment, said compliant provider being common to all the managed objects;
a non-compliant provider of dynamic services for the managed objects, said non-compliant provider running in a second operative environment that is not supported by the framework and an intermediate object running in the second operative environment;
said compliant provider further comprising
means for receiving a request from said framework for a first dynamic service for a selected managed object,
means for converting at least one parameter received from the framework with the request for the first dynamic service into at least one second parameter supported by the second operative environment,
means for identifying a non-compliant provider associated with the selected management object,
means for making a determination whether the second operative environment currently exists,
means for creating the second operative environment if the determination was that the second operative environment did not currently exist,
means for sending a request to the intermediate object for a second dynamic service for the selected management object, said request comprising an identifier for a non-compliant provider,
said intermediate object further comprising means for routing the request for the second dynamic service to the identified non-compliant provider, the routed request comprising at least one second parameter;
said identified non-compliant provider further comprising means for returning a result of the second dynamic service to the intermediate object;
said intermediate object further comprising means for forwarding the result to the compliant provider; and
said compliant provider further comprising
means for constructing a result of the first dynamic service according to the result of the second dynamic service,
means for returning the result of the first dynamic service to the framework, and
means for destroying the second operative environment after a predetermined time-out from a last use thereof.

5. A resource management infrastructure according to claim 4 wherein said intermediate object further comprises:
means for determining whether a non-compliant provider of a specific second dynamic service currently exists before requesting the specific second dynamic service;
means for creating the non-compliant provider of the specific second dynamic service if the determination was that said non-compliant provider of the specific second dynamic service did not currently exist; and
means for destroying the non-compliant provider of the specific second dynamic service after a predetermined further time-out from a last use thereof.

6. A resource management infrastructure according to claim 5 wherein the intermediate object further comprises:
means for, when requesting the specific second dynamic service from a non-compliant provider, removing a record including an identifier of the non-compliant provider of the specific dynamic service from a FIFO queue and inserting a new record into the FIFO queue including the identifier of the non-compliant provider of the specific dynamic service together with an expiration time thereof calculated to add further time to a current time;
means for setting a signaling time of a timer to an expiration time of a first record to be extracted from the FIFO queue;
means, responsive to the timer reaching the signaling time, for destroying the non-compliant provider identified in the first record of the FIFO queue;
means for extracting the first record from the FIFO queue; and
means for setting the signaling time to an expiration time of a next record to be extracted from the FIFO queue.

* * * * *